(12) United States Patent
Belk et al.

(10) Patent No.: US 11,680,819 B2
(45) Date of Patent: Jun. 20, 2023

(54) MANAGING CONFLICTS USING CONFLICT ISLANDS

(71) Applicant: Apple Inc., Cupertino, CA (US)

(72) Inventors: Andrew T. Belk, Campbell, CA (US); Ralph E. Lemke, Sunnyvale, CA (US); April C. Cutter, Sunnyvale, CA (US); Paul S. McCarthy, Farmington Hills, MI (US); Gunjan Gupta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 286 days.

(21) Appl. No.: 17/097,740

(22) Filed: Nov. 13, 2020

(65) Prior Publication Data

US 2021/0063170 A1   Mar. 4, 2021

Related U.S. Application Data

(63) Continuation of application No. 16/055,233, filed on Aug. 6, 2018, now Pat. No. 10,871,376.

(60) Provisional application No. 62/565,389, filed on Sep. 29, 2017.

(51) Int. Cl.
*G01C 21/00* (2006.01)
*G01C 21/34* (2006.01)
*G01C 21/36* (2006.01)

(52) U.S. Cl.
CPC ..... *G01C 21/3859* (2020.08); *G01C 21/3423* (2013.01); *G01C 21/367* (2013.01); *G01C 21/3691* (2013.01); *G01C 21/3856* (2020.08)

(58) Field of Classification Search
USPC .......................................... 701/532
See application file for complete search history.

(56) References Cited

U.S. PATENT DOCUMENTS

| 8,892,522 | B2 * | 11/2014 | Sugimoto | G09B 29/10 |
|---|---|---|---|---|
| | | | | 707/661 |
| 10,352,709 | B1 * | 7/2019 | Kalenkovich | G01C 21/3852 |
| 10,871,376 | B2 * | 12/2020 | Belk | G01C 21/32 |
| 2006/0074547 | A1 | 4/2006 | Kaufman et al. | |
| 2006/0122768 | A1 * | 6/2006 | Sumizawa | G01C 21/32 |
| | | | | 340/995.14 |
| 2015/0241223 | A1 | 8/2015 | Davidson | |
| 2019/0101397 | A1 | 4/2019 | Belk et al. | |
| 2019/0391969 | A1 * | 12/2019 | Koh | G06F 16/2282 |
| 2020/0050205 | A1 | 2/2020 | Mcclelland | |

* cited by examiner

*Primary Examiner* — Tyler D Paige
(74) *Attorney, Agent, or Firm* — Invoke

(57) ABSTRACT

In some implementations, a computing device can manage conflicts using conflict islands. For example, when a computing device receives bulk map data updates, the computing device can determine conflicts between point updates (e.g., small, ad hoc feature edits) in the current map data and the bulk map data updates. When the bulk map data updates are merged with the current map data, a point update for a map feature may conflict with the bulk update for the feature. The computing device can determine a perimeter of stable map features around the conflicted feature. The map features within the perimeter can correspond to a conflict island. The bulk updates for features within a conflict island (e.g., within the perimeter) can be deferred until resolved while bulk updates for features outside of a conflict island can be applied to the current map data.

20 Claims, 8 Drawing Sheets

MANAGING CONFLICTS USING CONFLICT ISLANDS

INCORPORATION BY REFERENCE; DISCLAIMER

Each of the following applications are hereby incorporated by reference: application Ser. No. 16/055,233 filed on Aug. 6, 2018; application No. 62/565,389 filed on Sep. 29, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to managing conflicts in large data sets.

BACKGROUND

The process of building a map involves many operations. In particular, two competing requirements are to process bulk map data updates that affect large geographic areas, while also handling smaller point updates (e.g., edits) to specific data in the same geographic regions. For example, a bulk map data update can be an (e.g., periodic) update that includes a large number of updates for a large geographic region. The bulk updates can be scheduled such that updates for a geographic region can be accumulated over time and be used to update a map data baseline (e.g., the current map data) in a single update. Point updates, on the other hand, can be small map data updates made directly in the map data baseline between the bulk map data updates. These operations are often performed in parallel. As a result, these operations can lead to downstream inconsistencies when an edit (e.g., point update) made to a specific map feature was made on one version of the map data, but by a separate bulk update process, the larger geographic area is updated with many changes affecting most of the map.

For example, the streets data in a map is a topological network of street related features. How each streets feature (e.g., road segment, intersection, etc.) connects and the geography (e.g., length, position, elevation, etc.) of the data is important and must be self-consistent to provide a correctly routable network. When a current version of the street data is edited (e.g., point update) to correct for a problem detected by the map owner, yet a newer version is provided through a bulk update, it generally becomes a manual process to resolve conflicts between a feature having point update and the bulk update that updates the same feature. This can delay the bulk update process by considerably longer than the actual bulk update takes to execute. These delays can result in bulk updates being delayed for long periods of time (e.g., indefinitely) while the update process waits for a human to resolve a feature conflict. Thus, a mechanism for decoupling conflict resolution from the bulk update process is needed.

SUMMARY

In some implementations, a computing device can manage conflicts using conflict islands. For example, when a computing device receives bulk map data updates, the computing device can determine conflicts between point updates (e.g., small, ad hoc feature edits) in the current map data and the bulk map data updates. When the bulk map data updates are merged with the current map data, a point update for a map feature may conflict with the bulk update for the feature. The computing device can determine a perimeter of stable map features around the conflicted feature. The map features within the perimeter can correspond to a conflict island. The bulk updates for features within a conflict island (e.g., within the perimeter) can be deferred until resolved while bulk updates for features outside of a conflict island can be applied to the current map data.

Particular implementations provide at least the following advantages. Bulk map updates can be published more quickly, while conflicts are resolved asynchronously.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
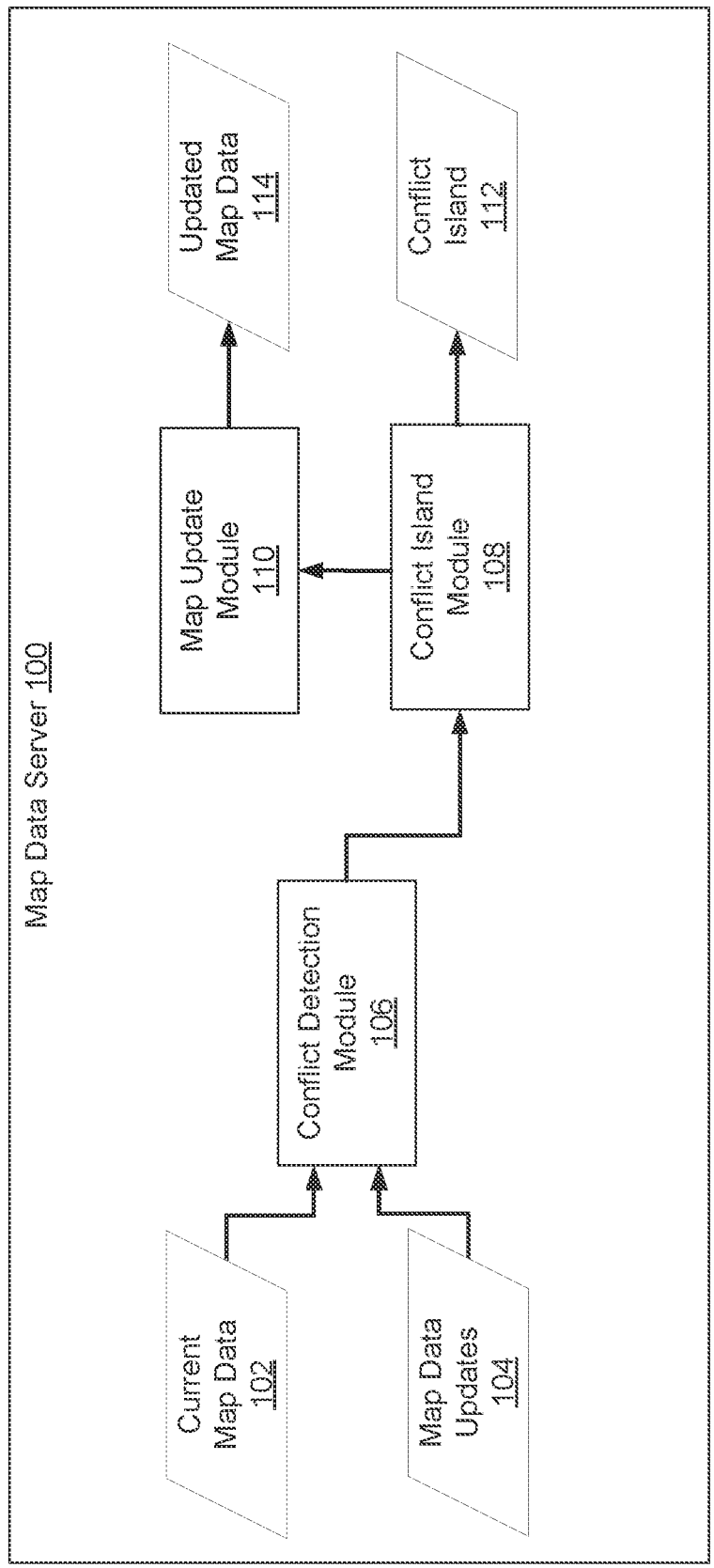
FIG. 1 is a block diagram of an example system for managing conflicts using conflict islands.

FIG. 1 is a block diagram of an example system 100 for managing conflicts using conflict islands. For example, system 100 can correspond to server computing device (e.g., map data server) that manages updating map data and publishing map data to user devices (e.g., smartphones, tablet computers, laptop computers, etc.) for use when displaying maps and/or providing navigation instructions. Map data server 100 can correspond to any computing device configuration that is capable of ingesting, processing, updating, and/or publishing map data.

Map data server 100 can include current map data 102. For example, current map data 102 can correspond to the current baseline (e.g., the current version of map data provided to client devices so that the client devices can present maps and map data) of data that is provided to client devices when client devices require or request map data from map data server 100. Current map data 102 can include data describing various map features that can be used to generate and/or present a map on a client device. The map features can correspond to street data, such as road segments, intersections, and other road features. The map features can correspond to points of interest (e.g., businesses, parks, residences, etc.). Each map feature can include various attributes. For example, a road segment feature may include attributes that describe the geographic location of the road segment, the speed limit for the road segment, etc. Each map feature can include references (e.g., pointers, links, etc.) to related map features. For example, a road segment can include references to other road segments, intersections, or other features to which the road segment connects.

In some implementations, current map data 102 can include point updates. For example, in between bulk updates of map data, current map data 102 can be edited to correct defects or errors in current map data 102. These errors may, for example, be reported by users of the map data provided by map data server 100 and the administrators of map data server 100 can perform small point updates to incorporate fixes to the reported defects. For example, while current map data 102 may indicate that a first road segment connects to a second road segment, a user may discover in real life that the first road segment does not connect to the second road segment. The user may report the discrepancy to the administrator of map data server 100 and the administrator may perform a point update of current map data 102 to fix the reported error.

In some implementations, map data server 100 can include map data updates 104. For example, map data updates 104 can correspond to a bulk map data update. Map data updates 104 may be obtained from a map data vendor on a periodic basis, for example, so that current map data 102 can be updated to reflect changes (e.g., additions, modifications, deletions, etc.) in various map features (e.g., street data, points of interest, etc.). For example, map data updates 104 can identify new map features to be added to current map data 102. Map data updates 104 can identify changes to map features (e.g., attribute changes) in current map data 102. Map data updates 104 can indicate that some map features in current map data 102 should be deleted.

In some implementations, map data server 100 can include conflict detection module 106. For example, conflict detection module 106 can identify conflicts between map feature updates described in map data updates 104 and point updates described in current map data 102. A conflict detection module 106 can determine or identify a conflict between an update of a feature in map data updates 104 and a point update of the same feature in current map data 102 when conflict detection module 106 determines that an incompatible change to the same feature and/or the same attribute of the feature was made in both map data updates 104 and a point update in current map data 102. For example, when a road segment feature in current map data 102 includes a point update that changes the geographic location of the road segment feature and map data updates 104 includes an update that changes to geographic location of the same road segment feature and the locations are different, then conflict detection module 106 can determine that a conflict between current map data 102 and map data updates 104 exists for this road segment feature. After identifying the conflicts between current map data 102 and map data updates 104, conflict detection module 106 can send the current map data 102, map data updates 104, and the identified conflicts to conflict island module 108.

In some implementations, map data server 100 can include conflict island module 108. For example, conflict island module 108 can generate conflict islands based on conflicts identified by conflict detection module 106. Conflict island module 108 can select a conflicted map feature identified by conflict detection module 106 and generate a conflict island for the selected map feature. After generating the conflict island, conflict island module 108 can select the next conflicted map feature and generate another conflict island for the newly selected map feature. This process can continue until conflict islands have been generated for each conflicted map feature.

As described above each map feature may include one or more references to other related or nearby map features. Thus, the relationships between map features can be represented by a node graph where each map feature is represented by a node and the links between map features can be represented by an edge or a line connecting each node, as illustrated by FIG. 2.

Figure 2:
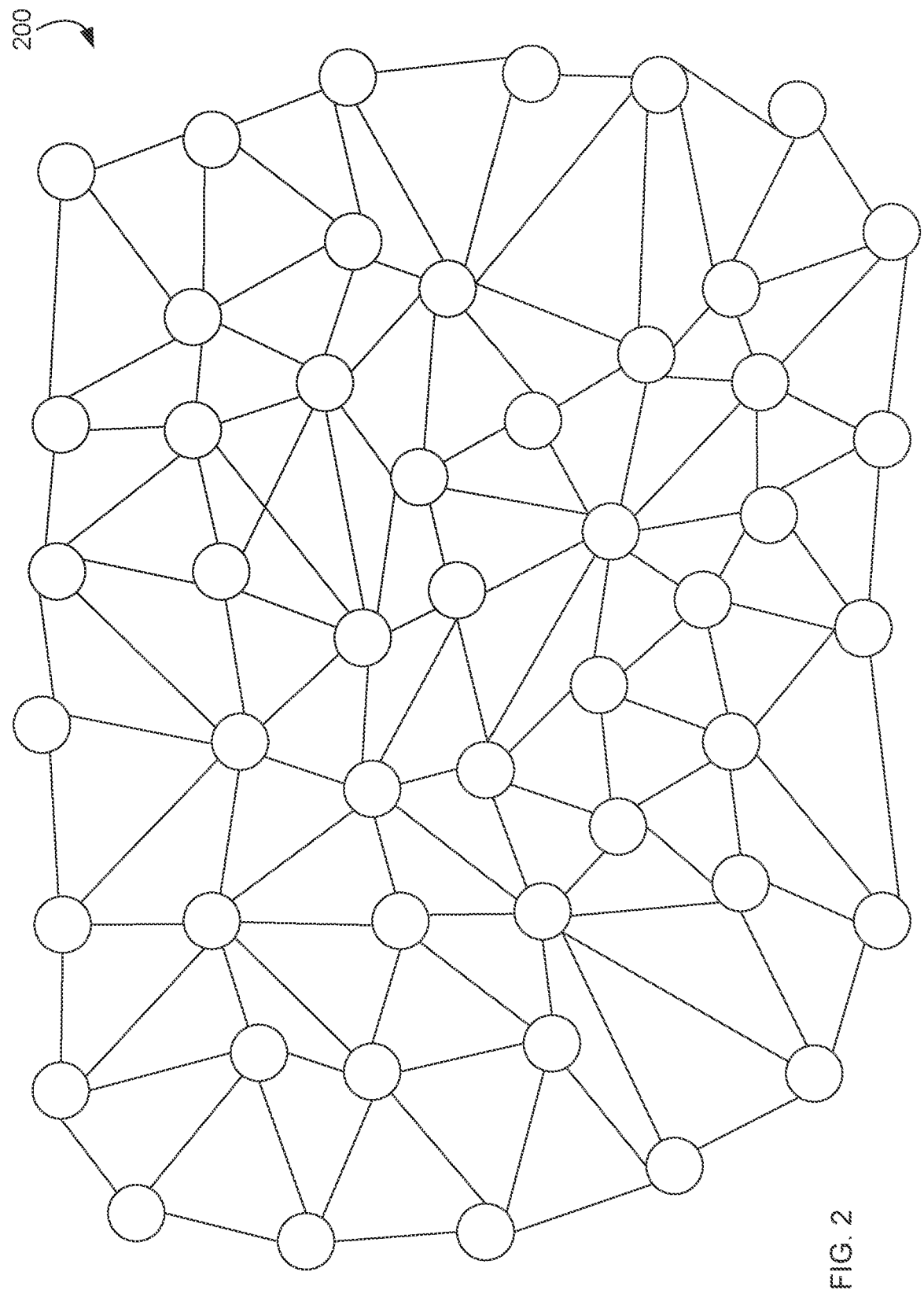
FIG. 2 illustrates a node graph representing relationships between map features.

FIG. 2 illustrates a node graph 200 representing relationships between map features. For example, node graph 200 can correspond to a geographical area (e.g., the whole world, a continent, a country, or other geographical region). Each node (e.g., circles) in node graph 200 can correspond to a map feature in current map data 102 and/or map data updates 104. The relationships (e.g., links, references, pointers, etc.) between map features is represented in node graph 200 by the lines connecting the various nodes.

Figure 3:
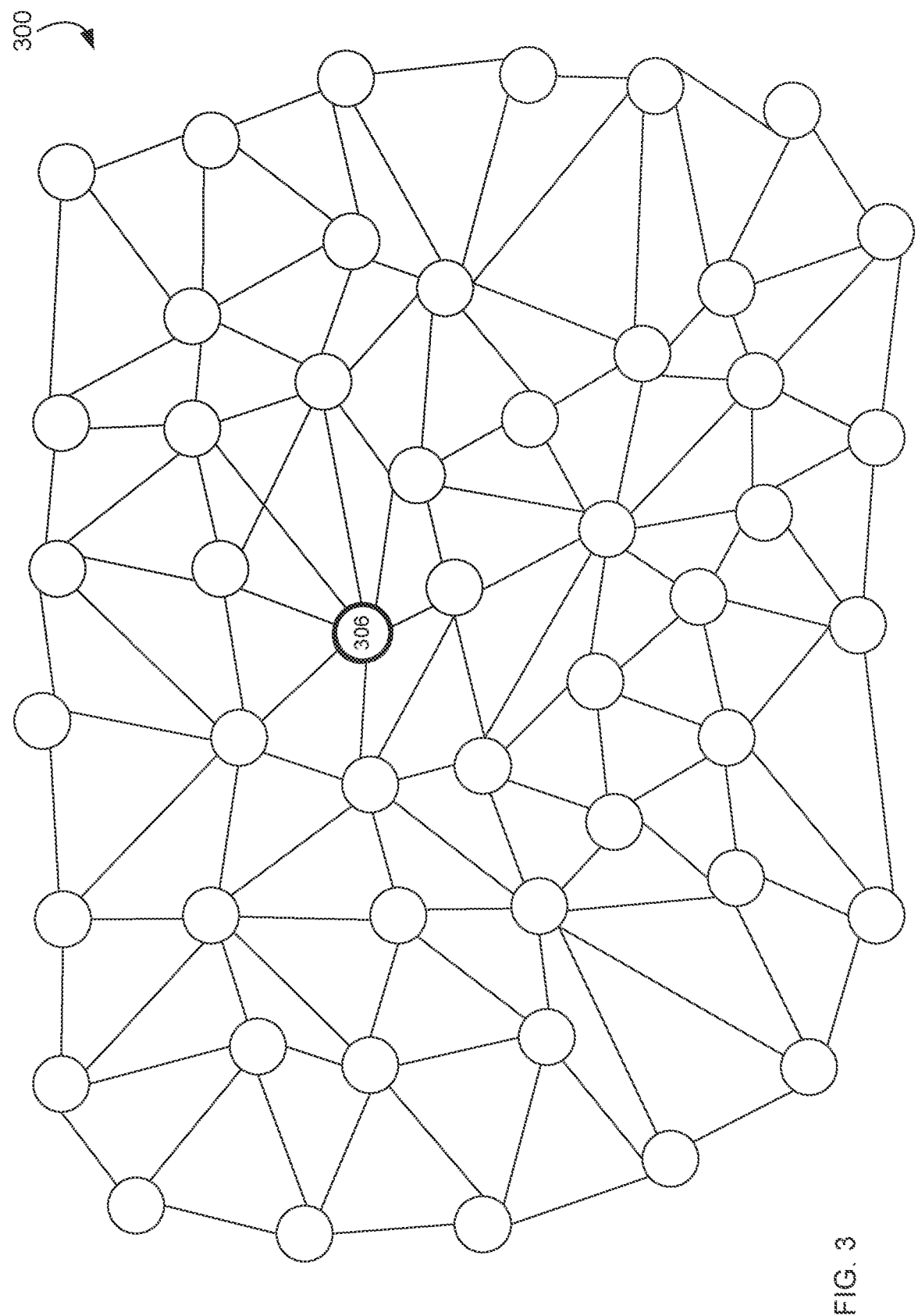
FIG. 3 illustrates a node graph representing relationships between map features and where two map features have been identified as having conflicts.

FIG. 3 illustrates a node graph 300 representing relationships between map features and where two map features have been identified as having conflicts. For example, node graph 300 can correspond to node graph 200 of FIG. 2. For example, when conflict detection module 106 compares current map data 102 with map data updates 104, conflict detection module 106 can determine that the feature corresponding to node 306 in current map data 102 and map data updates 104 include incompatible changes (e.g. a change in a point update in current map data 102 and an update in map data updates 104 that creates a conflict). An example of an incompatible change can include a point update that changes the geographic location of a map feature and a bulk update that changes the geographic location of the same map feature to a location that is different than the geographic location identified in the point update.

Figure 4:
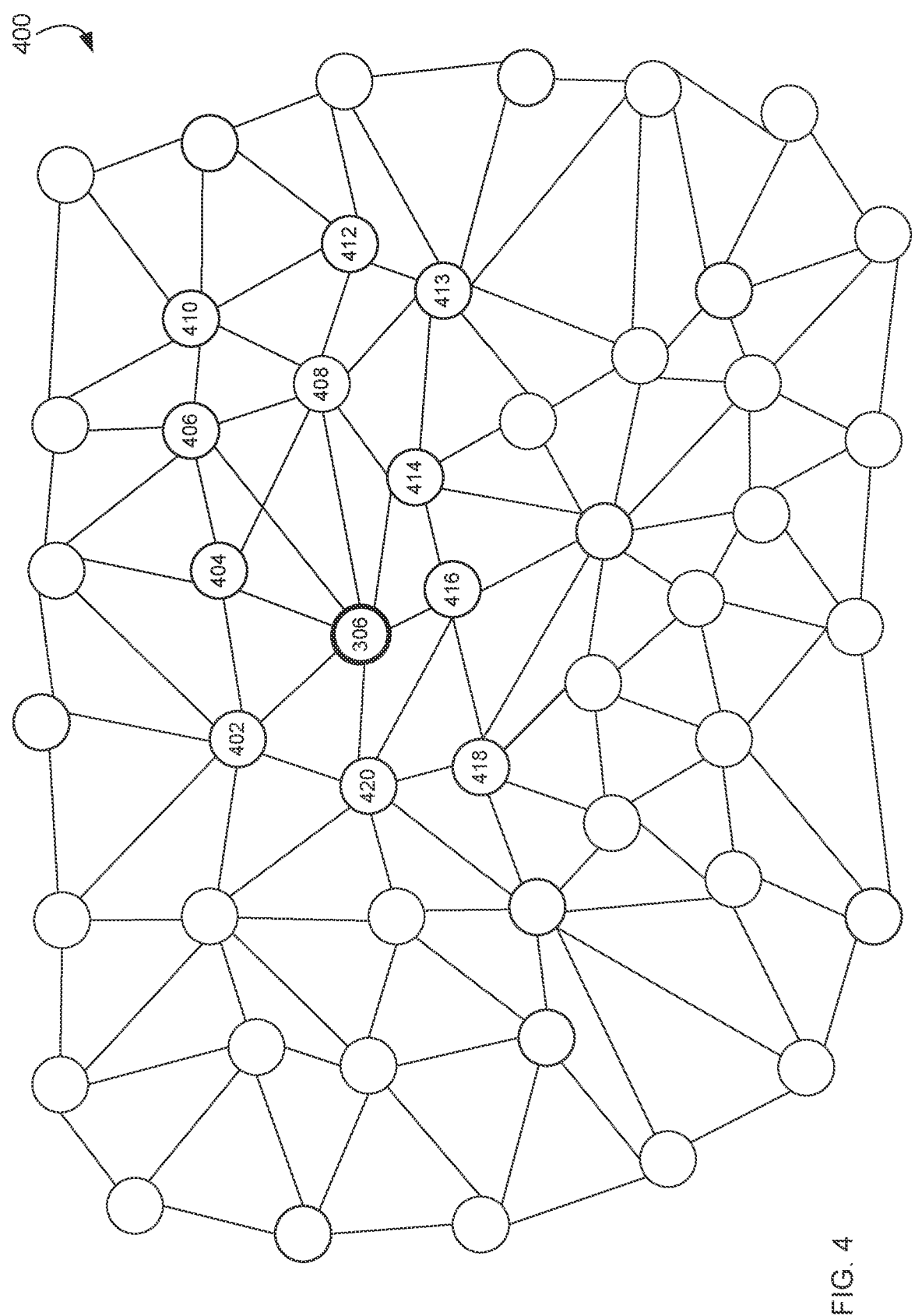
FIG. 4 illustrates a node graph representing relationships between map features and illustrating determining a perimeter for a conflict island.

FIG. 4 illustrates a node graph 400 representing relationships between map features and illustrating determining a perimeter for a conflict island. For example, node graph 400 can correspond to node graph 300 of FIG. 3. For example, after determining or identifying conflicts between current map data 102 and map data updates 104, conflict detection module 106 can send the identified conflicts (e.g., feature corresponding to node 306) to conflict island module 108. Conflict island module 108 can determine perimeter map features (e.g., corresponding to nodes 402, 404, 406, 410, 412, 413, 414, 416, 418, 420) that will define the boundaries of a conflict island. To simplify the description of the technology described herein, the term "node" and "map feature" are interchangeable. For example, starting with node 306, conflict island module 108 can follow the references (e.g., links) from node 306 to other nodes in node graph 300. When the linked node (e.g., node 402) is a stable node, then conflict island module 108 can select the linked node as a perimeter node for the conflict island corresponding to (e.g., generated for) conflicted node 306. For example, a perimeter node (e.g., perimeter map feature) can define the perimeter or edge or outer limits of the conflict island.

In some implementations, a stable node can be a node that has not changed or has changed in an insignificant way between current map data 102 and map data updates 104. Various criteria can be analyzed by conflict island module 108 to determine if a node is a stable node. For example, conflict island module 108 can determine that a node is stable when the node is not involved in any conflict (e.g., two-way conflict, an incompatible update, etc.) that requires further review. Conflict island module 108 can determine that a node is stable when the node does not refer directly to any feature that is involved in a conflict that requires human review. Conflict island module 108 can determine that a node is stable when the node corresponds to a map feature that has the same geometry in the current and the updated versions of the map. Conflict island module 108 can determine that a node is stable when the node corresponds to a map feature that has the same location (e.g., map coordinates) in the current and the updated versions of the map. Conflict island module 108 can determine that a node is stable when the node corresponds to a map feature that has the same road entry and exit points in the current and the updated versions of the map. By preserving road entry and exit points into and out of the conflict island, conflict island module 108 can ensure that routability (i.e., the ability to generate navigation routes) through the conflict island is preserved. Conflict island module 108 can use one or any combination of the above criteria to determine stable nodes and define the perimeter of the conflict island corresponding to the conflicted node (e.g., node 306).

In some implementations, conflict island module 108 can determine node stability based on some node (e.g., map feature) attributes and ignore other attributes. For example, some node attributes can be important for the stability of the map data and/or for the ability to generate navigation routes. These important node attributes can include geographic features, such as shape, location, topology, etc. When a geographic attribute of a street node is changed from one version of map data to the next, the ability to generate navigation routes through nodes associated with a conflict island may be impaired. Thus, when map updates change geographic features or other important features of a node, the node will not be identified as a stable node. On the other hand, changes to unimportant node features, such as road signage, speed limit, etc., can be ignored when determining whether a node is a stable node because changes to these features do not affect the ability to generate navigation routes through nodes associated with a conflict island.

When the linked node (e.g., node 408) is not a stable node, conflict island module 108 can determine whether the nodes (e.g., nodes 406, 410, 412, 413, 414) linked to the first linked node (e.g., node 408) are stable and extend the perimeter for the conflict island for node 306 to these nodes if they are stable nodes. In some implementations, only nodes corresponding to street features (e.g., road segments, intersections, etc.) of a map will be selected as a perimeter node.

When searching for stable nodes to form the perimeter for a conflict island, conflict island module 108 may limit the size of the conflict island by limiting the number of hops (e.g., links, references, etc.) away from the conflicted node that conflict island module will extend the perimeter of the conflict island. For example, the number of hops from conflicted node 306 to node 402 can be considered one hop (e.g., one link traversed between nodes). The number of hops from conflicted node 306 to node 412 can be considered two hops (e.g., one hop from node 306 to node 408, one hope from node 408 to node 412). When conflict island module 108 traverses more than a threshold number of hops (e.g., 150 hops, 100 hops, 75 hops, etc.) without finding a stable node to define the perimeter of the conflict island, conflict island module 108 can terminate the conflict island generation process and save information indicating that conflicted node 306 must be resolved before map data updates 104 can be merged with current map data 102.

Figure 5:
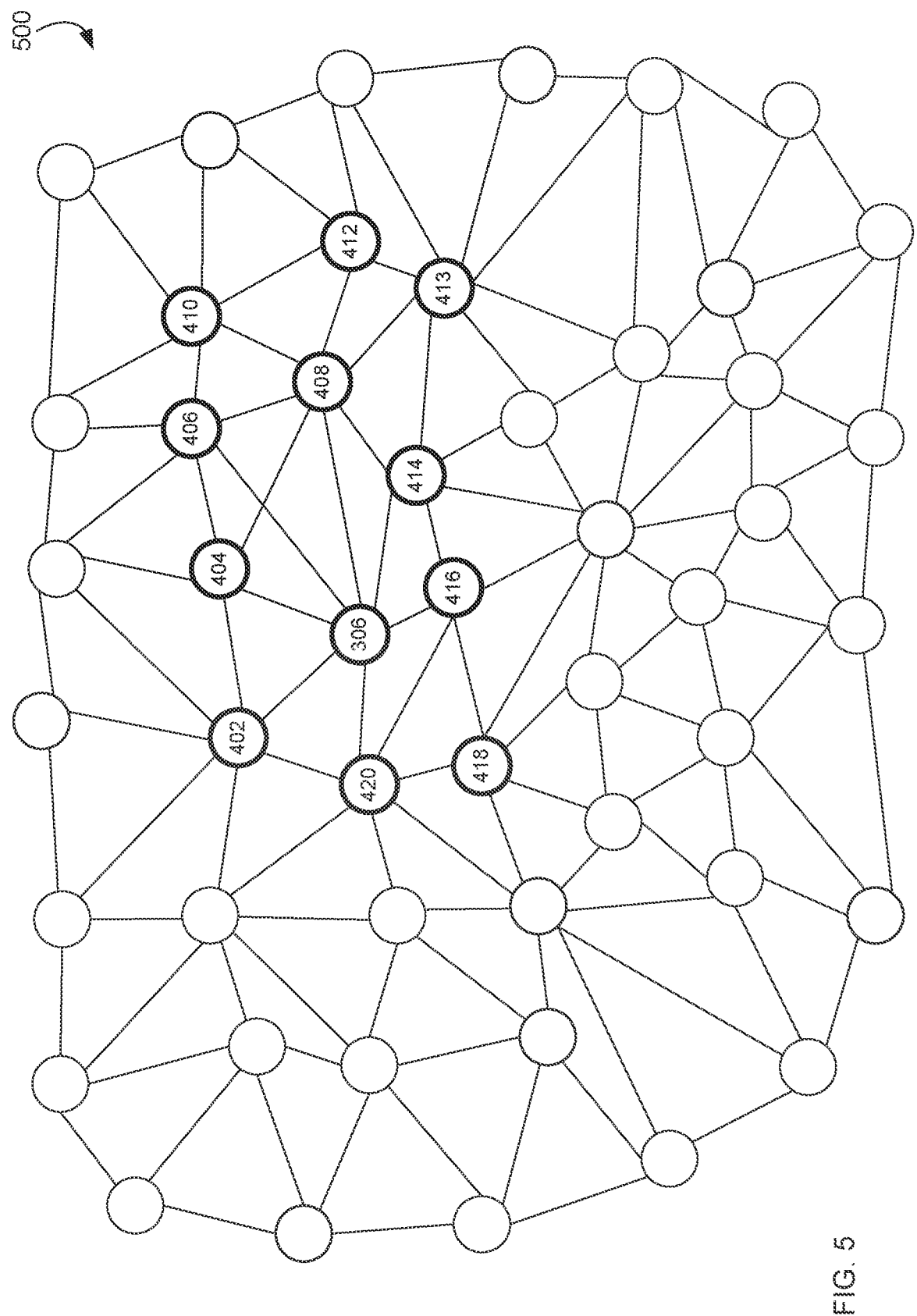
FIG. 5 illustrates a node graph representing relationships between map features and illustrating generating a conflict island for a conflicted node.

FIG. 5 illustrates a node graph 500 representing relationships between map features and illustrating generating a conflict island for a conflicted node. For example, node graph 500 can correspond to node graph 400, described above. Conflict island module 108 can generate a conflict island based on the stable nodes that define the perimeter of the conflict island for a conflicted node. For example, the stable nodes that define the perimeter of the conflict island corresponding to conflicted node 306 can include nodes 402, 404, 406, 410, 412, 413, 414, 416, 418, and 420. Conflict island module 108 can generate a conflict island that includes all of the nodes (e.g., map features) within the stable perimeter.

A conflict island is a group of related nodes (e.g., map features) that include and surround a conflicted node. The conflict island is generated in such a way that when nodes external to the conflict island are updated and nodes within the conflict island are not updated, routability through the conflict island is preserved. Thus, a conflict island can be defined as a group of map features that includes a conflicted map feature surrounded by related map features. The conflict island extends from the conflicted map feature to stable perimeter map features that define the boundary or edge of the conflict island. By using stable perimeter map features to define the perimeter of the conflict island, conflict island module 108 can preserve routability from updated map features external to the conflict island through the group of map features within the conflict island even though the map features within the conflict island have not been updated.

After generating the conflict island, conflict island module 108 can send information identifying the nodes in the conflict island, current map data 102, and map data updates 104 to map update module 110. Map update module 110 can update current map data 102 with map data updates 104 while excluding the nodes (e.g., map features) corresponding to the generated conflict island from the update process. Thus, map update module 110 can generate updated map data 114 by merging map data updates 104 with current map data 102 while excluding map data updates corresponding to the nodes in the conflict island. Map data server 100 can then make updated map data 114 available for downloading to client devices that require map data to generate maps and/or navigation information.

Figure 6:
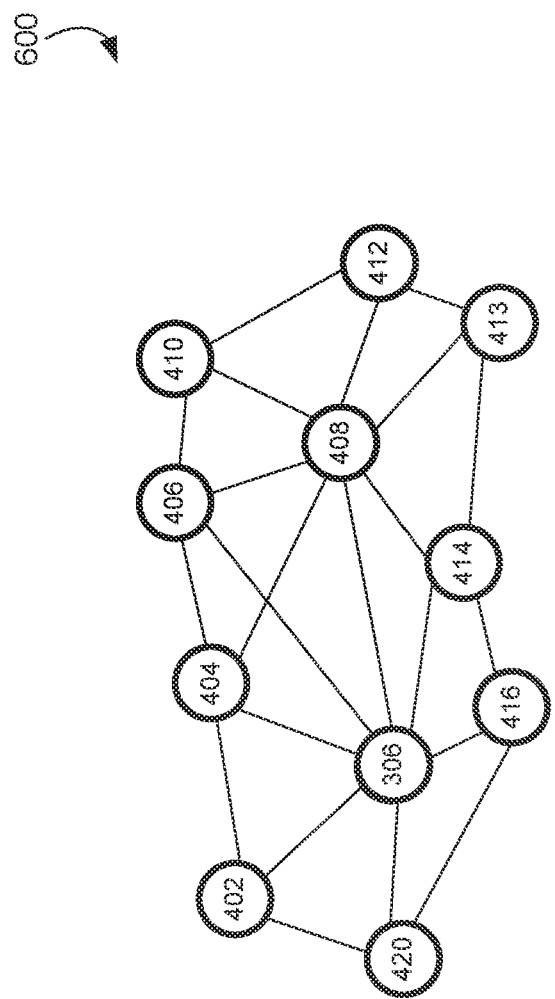
FIG. 6 illustrates a node graph of a conflict island.

FIG. 6 illustrates a node graph 600 of a conflict island. For example, node graph 600 can correspond to a portion of node graph 500 representing the conflict island generated for conflicted node 306. Node graph 600 can include nodes 306, 402, 404, 406, 408, 410, 412, 413, 414, 416, 418, and 420. Conflict island module 108 can save the conflict island as conflict island 112 of FIG. 1 for later review so that a human or a computing system can resolve the conflicts between the point updates in current map data 102 and the bulk updates in map data updates 104. In some implementations, conflict island 112 can identify the nodes (e.g., map features) that are included in the conflict island. In some implementations, conflict island 112 can include the map feature data from current map data 102 and the updated map feature data from map data updates 104 corresponding to the nodes within the generated conflict island so that a human can compare map data updates 104 with current map data 102 corresponding to the nodes within the conflict island and resolve the conflict associated with node 306.

In some implementations, conflict island module 108 can merge conflict islands. For example, conflict island module 108 can generate individual conflict islands for each node (e.g. map feature) having an incompatible conflict between current map data 102 and map data updates 104. Conflict island module 108 can compare one conflict island with other conflict islands to determine if there is an overlap between conflict islands. For example, an overlap between conflict islands can exist when one conflict island includes some or all of the nodes included in another conflict island. When an overlap between two or more conflict islands exists, conflict island module 108 can merge the overlapping conflict island into a single combined conflict island that includes all nodes from the merged conflict islands. The combined conflict island can then be stored for later analysis and conflict resolution, as described above.

Example Process

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 7:
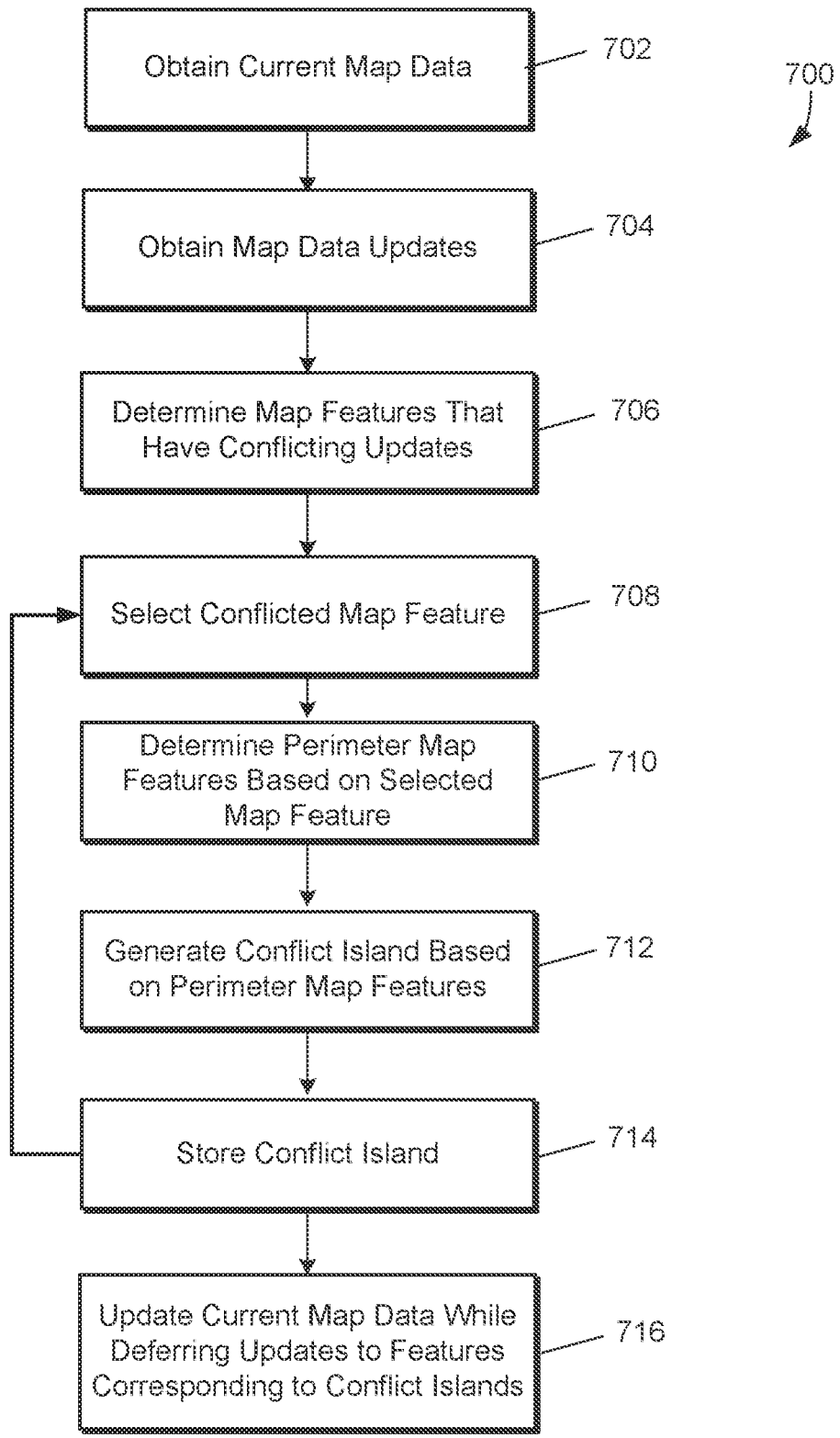
FIG. 7 is flow diagram of an example process for managing conflicts using conflict islands.

FIG. 7 is flow diagram of an example process 700 for managing conflicts using conflict islands. For example, process 700 can be performed by a computing device (e.g., map data server 100) to manage conflicts when a current version of map data is updated or changed to include new map features and/or map feature attributes. Conflict islands can be used to defer conflict resolution and/or map updates for a small portion of the map data corresponding to a conflict, while still allowing for performing a bulk update of most of the map data.

At step 702, the computing device can obtain current map data. For example, map data server 100 can obtain current map data corresponding to the latest published or distributed version of the map data. The current map data can be stored on the computing device or stored in a separate database. Thus, map data server 100 can obtain the current map data from a local storage device or a remote storage device. As described above, the current map data can include records or data entries for each map feature. The records or data entries can include fields describing or defining various attributes for the corresponding map feature. The current map data can include point updates (e.g., small corrections or changes) to correct errors in the current version of the current map data.

At step 704, the computing device can obtain map data updates. For example, map data server 100 can obtain bulk map data updates from a third party vendor. Map data server 100 can obtain bulk map data updates generated by the administrator of map data server 100 or from another source. As described above, the map data updates can include records or data entries for map features that have updates or changes that should be applied to the current map data. The records or data entries can include fields describing or defining various attributes for the corresponding map feature. The map data updates can define new map features and/or changes to attributes of previously existing map features.

At step 706, the computing device can determine map features that have conflicting updates. For example, map data server 100 can determine that a conflict exists between the current map data and the map data updates when the feature and/or the same attribute of a feature has a point update in the current map data and an update in the bulk map data updates. When the feature and/or the same attribute of a feature has a point update in the current map data and an update in the bulk map data updates that are not identical, this can be referred to as an incompatible update (e.g., a change in both current map data and bulk map data updates). When a map feature or map feature attribute is the subject of an incompatible update, map data server 100 can determine that there is a conflict associated with the map feature or map feature attribute. Map data server 100 can compare the current map data to the map data updates to determine all of the map features that have conflicts between the point updates in the current map data and the bulk map data updates.

At step 708, the computing device can select a conflicted map feature. For example, after map data server 100 determines which map features in the map data updates have updates that conflict with point updates in the current map data, map data server 100 can select a conflicted map feature and generate a conflict island for the conflicted map feature, as described herein. Map data server 100 can iterate through all of the conflicted map features and generate a conflict island for each one until a conflict island has been generated for each conflicted map feature.

At step 710, the computing device can determine perimeter map features based on the selected map feature. For example, map data server 100 can follow links from the selected map feature (e.g., the conflicted feature) to other map features (e.g., nodes above) to determine which linked map features are stable (e.g., stable nodes), as described above. Map data server 100 can determine a perimeter of map features (e.g., nodes) based on the stable map features (e.g., directly or indirectly) linked to the selected map feature, as described above with reference to FIGS. 2-6.

At step 712, the computing device can generate a conflict island based on the perimeter map features. For example, map data server 100 can generate a conflict island that includes the perimeter map features and/or all map features within the area defined by the perimeter map features. The conflict island can include information that identifies the perimeter map features and/or all map features within the area defined by the perimeter map features. The conflict island can include the current map data and the map data updates corresponding to the map features within the conflict island.

At step 714, the computing device can store the generated conflict island. For example, map data server 100 can store the information defining the conflict island so that the conflict related to the selected map feature can be resolved at a later time. Thus, the conflict related to the selected map feature can be resolved asynchronously to the bulk update of the current map data. When additional conflicted map features without conflict islands remain, map data server 100 can select another conflicted map feature at step 708. When conflict islands have been generated for all conflicted map features, process 700 can continue to step 716.

At step 716, the computing device can update the current map data while deferring updates to features corresponding to conflict islands. For example, map data server 100 can merge the bulk updates for map features included in the map data updates with the corresponding map features included in the current map data for all map features that are not included in a conflict island.

Example System Architecture

Figure 8:
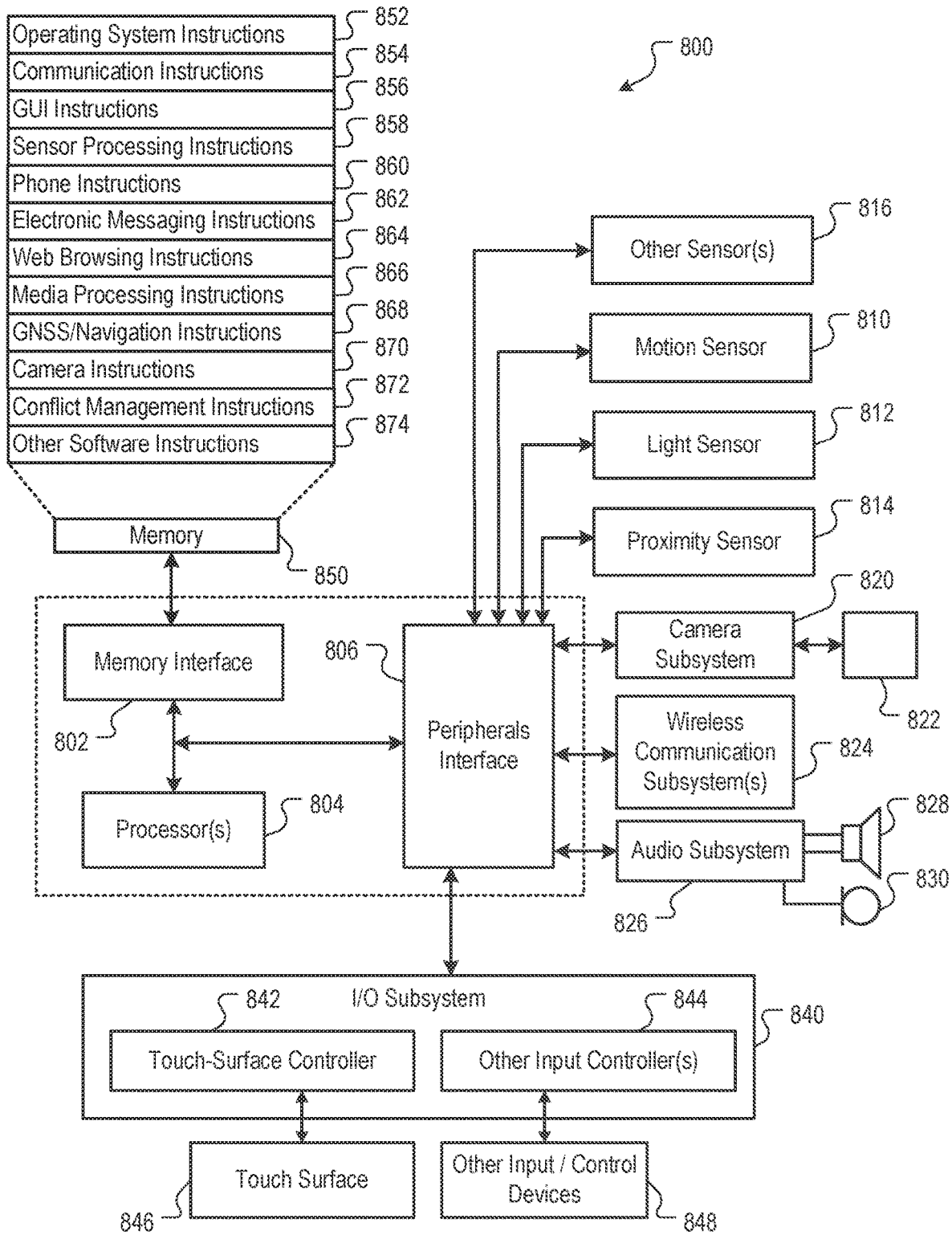
FIG. 8 is a block diagram of an example computing device that can implement the features and processes of FIGS. 1-7.

FIG. 8 is a block diagram of an example computing device 800 that can implement the features and processes of FIGS. 1-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 100 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voiceprinting and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™. The computing device 800 can, therefore, include a 36-pin connector that is compatible with the iPod. Other input/output and control devices can also be used.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing voice authentication. For example, operating system 852 can implement the conflict management features as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store other software instructions 872 to facilitate other processes and functions, such as the conflict management processes and functions as described with reference to FIGS. 1-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

What is claimed is:

1. A method of managing map data update conflicts, the method comprising:
   determining, by a computing device for a first map feature of map data comprising a plurality of map features, that a bulk map data update for the map data conflicts with a first point update for the first map feature, wherein the bulk map data update affects more map features of the map data than the first point update;
   generating, by the computing device, a first conflict island that includes the first map feature and a first subset of the plurality of map features for which no conflict exists between the bulk map data update and the first point update, wherein the first subset of the plurality of map features defines a perimeter of the first conflict island;
   determining, by the computing device for a second map feature of the map data, that the bulk map data update conflicts with a second point update for the second map feature;
   generating, by the computing device, a second conflict island that includes the second map feature and a second subset of the plurality of map features for which no conflict exists between the bulk map data update and the second point update, wherein the second subset of the plurality of map features defines a perimeter of the second conflict island;
   determining, by the computing device, that at least one map feature is included within both the first subset and the second subset;
   merging, by the computing device, the first conflict island and the second conflict island into a combined conflict island, wherein at least some of the first subset and the second subset define a perimeter of the combined conflict island; and
   updating, by the computing device, the plurality of map features with the bulk map data update while excluding the combined conflict island from the updating.

2. The method of claim 1, further comprising resolving one or more conflicts between the bulk map data update and the first point update for map features in the combined conflict island.

3. The method of claim 1, further comprising:
   determining that the first point update includes a first change to map data for the first map feature;
   determining that the bulk update includes a second change to map data for the first map feature that is different from the first change; and
   determining that a conflict in map data exists for the first map feature.

4. The method of claim 1, further comprising identifying a first plurality of map feature attributes associated with the plurality of map features; and
based on the identified first plurality of map feature attributes, selecting the first subset of the plurality of map features to be included within the first conflict island.

5. The method of claim 4, further comprising
   applying one or more criteria to the first plurality of map feature attributes, wherein the one or more criteria include that a geometry of the first subset of the plurality of map features has not changed between the bulk map data update and the first point update;
   based on the one or more criteria, determining that a third map feature is a stable map feature that exists along a perimeter of the first conflict island; and
   based on the determination, including the third map feature in the first subset of the plurality of map features.

6. The method of claim 5, further comprising:
   applying the one or more criteria to a first map feature attribute of the first plurality of map feature attributes but not to a second map feature attribute of the first plurality of map feature attributes.

7. The method of claim 5, wherein the first plurality of map feature attributes includes a road entry point attribute and a road exit point attribute, further comprising:
   determining that no conflict exists between the bulk map data update and the first point update for the road entry point attribute and the road exit point attribute of the third map feature; and
   in response to the determination, determining that the third map feature is a stable map feature.

8. The method of claim 1, further comprising:
   storing the map data for the plurality of map features as a node graph, wherein each map feature of the plurality of map features corresponds to a node in the node graph;
   identifying that a conflict exists for the first map feature, the first map feature being represented by a conflicted node;
   identifying a first node that is a first number of hops away from the conflicted node;
   determining that the first node is a stable node; and
   in response to the determination, including the first node in the first subset.

9. The method of claim 8, wherein the first subset includes perimeter nodes of the conflict island and inner nodes of the conflict island.

10. The method of claim 8, wherein the first subset includes perimeter nodes of the conflict island but not inner nodes of the conflict island.

11. A non-transitory computer readable medium including one or more sequences of instructions for managing map data update conflicts that, when executed by one or more processors, cause the one or more processors to perform operations comprising:
   determining, for a first map feature of map data comprising a plurality of map features, that a bulk map data update for the map data conflicts with a first point update for the first map feature, wherein the bulk map data update affects more map features of the map data than the first point update;
   generating a first conflict island that includes the first map feature and a first subset of the plurality of map features for which no conflict exists between the bulk map data update and the first point update, wherein the first subset of the plurality of map features defines a perimeter of the first conflict island;

determining, for a second map feature of the map data, that the bulk map data update conflicts with a second point update for the second map feature;

generating a second conflict island that includes the second map feature and a second subset of the plurality of map features for which no conflict exists between the bulk map data update and the second point update, wherein the second subset of the plurality of map features defines a perimeter of the second conflict island;

determining that at least one map feature is included within both the first subset and the second subset;

merging the first conflict island and the second conflict island into a combined conflict island, wherein at least some of the first subset and the second subset define a perimeter of the combined conflict island; and updating the plurality of map features with the bulk map data update while excluding the combined conflict island from the updating.

12. The non-transitory computer readable medium of claim 11, wherein the instructions cause:

identifying a first plurality of map feature attributes associated with the plurality of map features; and based on the identified first plurality of map feature attributes, selecting the first subset of the plurality of map features to be included within the first conflict island.

13. The non-transitory computer readable medium of claim 12, wherein the instructions cause:

applying one or more criteria to the first plurality of map feature attributes, wherein the one or more criteria include that a geometry of the first subset of the plurality of map features has not changed between the bulk map data update and the first point update;

based on the one or more criteria, determining that a third map feature is a stable map feature that exists along a perimeter of the first conflict island; and based on the determination, including the third map feature in the first subset of the plurality of map features.

14. The non-transitory computer readable medium of claim 12, wherein the instructions cause:

storing the map data for the plurality of map features as a node graph, wherein each map feature of the plurality of map features corresponds to a node in the node graph;

identifying that a conflict exists for the first map feature, the first map feature being represented by a conflicted node;

identifying a first node that is a first number of hops away from the conflicted node;

determining that the first node is a stable node; and in response to the determination, including the first node in the first subset.

15. A system comprising:

one or more processors; and a non-transitory computer readable medium including one or more sequences of instructions for managing map data update conflicts that, when executed by the one or more processors, cause the one or more processors to perform operations comprising:

determining, for a first map feature of map data comprising a plurality of map features, that a bulk map data update for the map data conflicts with a first point update for the first map feature, wherein the bulk map data update affects more map features of the map data than the first point update;

generating a first conflict island that includes the first map feature and a first subset of the plurality of map features for which no conflict exists between the bulk map data update and the first point update, wherein the first subset of the plurality of map features defines a perimeter of the first conflict island;

determining, for a second map feature of the map data, that the bulk map data update conflicts with a second point update for the second map feature;

generating a second conflict island that includes the second map feature and a second subset of the plurality of map features for which no conflict exists between the bulk map data update and the second point update, wherein the second subset of the plurality of map features defines a perimeter of the second conflict island;

determining that at least one map feature is included within both the first subset and the second subset;

merging the first conflict island and the second conflict island into a combined conflict island, wherein at least some of the first subset and the second subset define a perimeter of the combined conflict island; and updating the plurality of map features with the bulk map data update while excluding the combined conflict island from the updating.

16. The system of claim 15, wherein the instructions cause:

identifying a first plurality of map feature attributes associated with the plurality of map features; and based on the identified first plurality of map feature attributes, selecting the first subset of the plurality of map features to be included within the first conflict island.

17. The system of claim 16, wherein the instructions cause:

applying one or more criteria to the first plurality of map feature attributes, wherein the one or more criteria include that a geometry of the first subset of the plurality of map features has not changed between the bulk map data update and the first point update;

based on the one or more criteria, determining that a third map feature is a stable map feature that exists along a perimeter of the first conflict island; and based on the determination, including the third map feature in the first subset of the plurality of map features.

18. The system of claim 17, wherein the instructions cause:

applying the one or more criteria to a first map feature attribute of the first plurality of map feature attributes but not to a second map feature attribute of the first plurality of map feature attributes.

19. The system of claim 17, wherein the first plurality of map feature attributes includes a road entry point attribute and a road exit point attribute, wherein the instructions cause:

determining that no conflict exists between the bulk map data update and the first point update for the road entry point attribute and the road exit point attribute of the third map feature; and in response to the determination, determining that the third map feature is a stable map feature.

20. The system of claim 15, wherein the instructions cause:

storing the map data for the plurality of map features as a node graph, wherein each map feature of the plurality of map features corresponds to a node in the node graph;
identifying that a conflict exists for the first map feature, the first map feature being represented by a conflicted node;
identifying a first node that is a first number of hops away from the conflicted node;
determining that the first node is a stable node; and
in response to the determination, including the first node in the first subset.

* * * * *